No. 661,175. Patented Nov. 6, 1900.
S. HAIGH.
VALVE.
(Application filed Aug. 5, 1899.)
(No Model.)
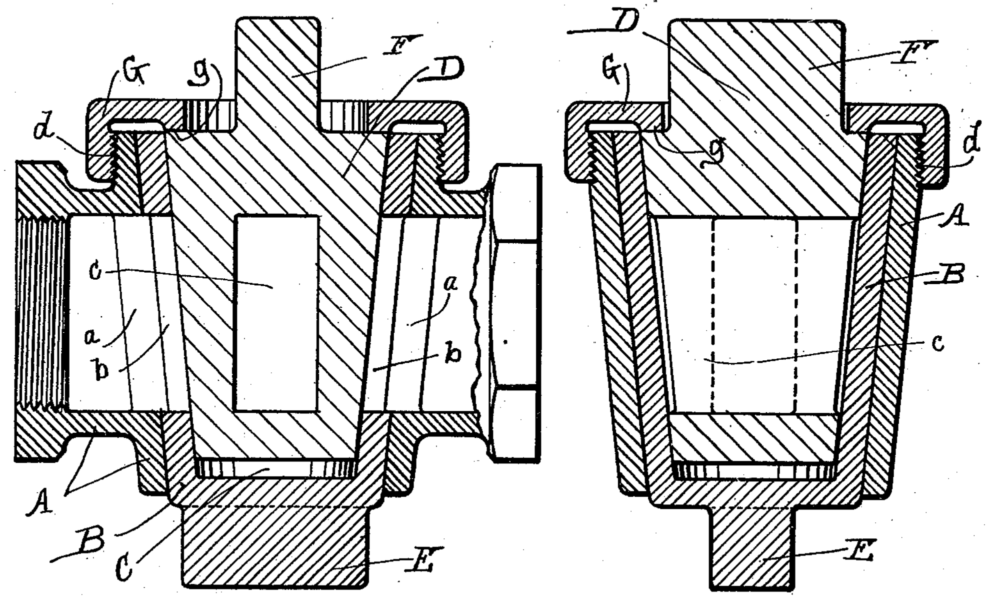
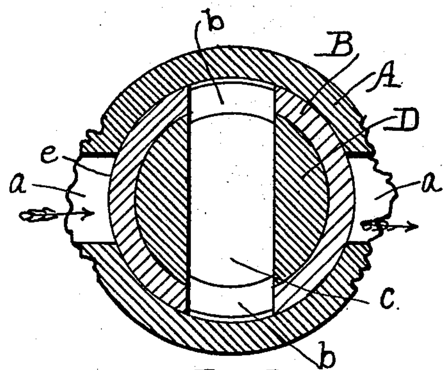
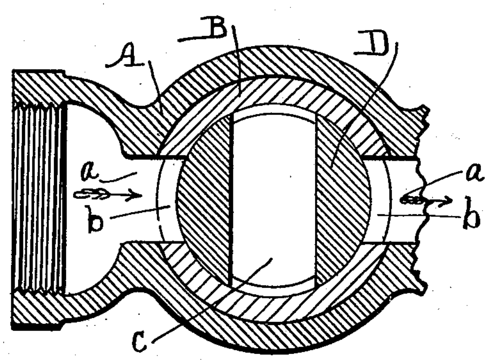
Fig. 5.
Witnesses.
John Sofge
John W. Grace
Inventor.
Samuel Haigh
by Charles J. Trott Atty.
THE NORRIS PETERS CO., PHOTO-LITHO., WASHINGTON, D. C.

UNITED STATES PATENT OFFICE.

SAMUEL HAIGH, OF CINCINNATI, OHIO.

VALVE.

SPECIFICATION forming part of Letters Patent No. 661,175, dated November 6, 1900.

Application filed August 5, 1899. Serial No. 726,323. (No model.)

*To all whom it may concern:*

Be it known that I, SAMUEL HAIGH, a citizen of the United States, residing at Cincinnati, Ohio, have invented certain new and useful Improvements in Valves, of which the following is a specification.

My invention relates to valves having a rotatable taper plug seated in an outer casing and provided with the usual transmission-passages, its object being to preserve as nearly as possible in their original condition those surfaces upon which the efficiency of the valve depends, thereby enhancing their durability in situations where they are subjected to rough usage.

With this object in view my invention is described in the specification hereto annexed and represented by the following drawings, in which—

Figure 1 is an axial section in the line of transmission. Fig. 2 is a similar section across the line of transmission; and Figs. 3, 4, and 5 are transverse middle sections through the transmission-passages and show the relative positions, respectively, of the various parts of the valve in the successive operations from a closed to an open position.

In the accompanying drawings similar letters refer to corresponding parts.

A represents the main body of the valve, with port-openings *a a* and a taper seat or bore to receive and fit the auxiliary taper casing B. The casing B is provided with ports *b b*, intersecting a longitudinal recess C within the casing B, of a somewhat larger diameter than the width of the port-openings *b b*, thus forming a shell or casing into which the plug D is seated. The port-opening *c* through plug D is similar to those provided at *a a* and *b b*, and all parts are so related that they may be brought into coincidence to form a continuous passage, as shown in Fig. 5. At E and F are shown flattened extensions of the casing B and plug D, respectively, for the purpose of receiving a wrench when operating the valve. In order to place the several parts of the valve in an operative relation, I show a nut G, having a threaded connection with the outer casing A at *d* and a bearing connection with the plug D at *g*.

For the operation of the valve let us first assume that the valve is in a closed position, as shown by Fig. 3. Now by applying the wrench to E and F the auxiliary casing B must be turned first, and the parts will then assume the relation as shown in Fig. 4, plug D being still in its original position. Now by turning plug D with a wrench applied to F the valve-passage will be fully opened, as shown in Fig. 5. It will be observed that the plug D in its action within the auxiliary casing B is the same and is subject to the same wear as in a valve of ordinary construction, while the exposed surface *e* of the auxiliary casing B during its rotation to an open position is not subjected to the rush of liquids or material, owing to the fact that the plug D intervenes between the inlet and outlet openings, thus retaining its contact-surfaces in their original condition and preventing a leaky valve.

It is apparent that my valve will admit of several modifications, among which are, first, in the construction illustrated in Figs. 1 and 2 the plug D and its concomitant recess C is tapered and parallel to the seat in the main body or casing A. This may be changed so that the plug D and its seat C are cylindrical in form, which will produce the same effect; and, second, in the method of securing the several parts which are involved in my invention as an operative mechanism other means than those which I show at G and *d* may be employed to effect the same purpose. I do not therefore wish to be restricted to the particular construction here shown.

Having thus described my invention, what I claim as new, and desire to secure by Letters Patent of the United States, is—

1. In a valve with registering transmission-passages, the combination of an outer casing A; a rotatable intermediate casing B; the rotatable plug D seated within the intermediate casing B; and the nut G in threaded connection with the outer casing A, substantially as described and for the purpose specified.

2. In connection with the outer casing of a valve having the usual transmission-passages, the combination of an auxiliary or intermediate casing B with registering passages intersecting an internal recess C; means for rotating the casing B, as shown at E; the rotatable plug D having a similar registering passage *c*; means for rotating plug *d*, as shown at F; and the nut G to secure the parts, substantially as described and for the purpose specified.

In testimony whereof I affix my signature in the presence of two witnesses.

SAMUEL HAIGH.

Witnesses:
JOHN W. GRACE,
JOHN SOFGE.